United States Patent
Nakata et al.

(10) Patent No.: US 8,992,209 B2
(45) Date of Patent: Mar. 31, 2015

(54) METAL MOLD FOR INJECTION MOLDING OF FRAMED GLASS AND MANUFACTURING METHOD FOR FRAMED GLASS

(75) Inventors: Osamu Nakata, Tsu (JP); Mitsuhiro Takayama, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 264 days.

(21) Appl. No.: 12/936,479

(22) PCT Filed: May 1, 2009

(86) PCT No.: PCT/JP2009/058550
§ 371 (c)(1),
(2), (4) Date: Oct. 5, 2010

(87) PCT Pub. No.: WO2009/139308
PCT Pub. Date: Nov. 19, 2009

(65) Prior Publication Data
US 2011/0031647 A1    Feb. 10, 2011

(30) Foreign Application Priority Data
May 12, 2008 (JP) .................. 2008-124468

(51) Int. Cl.
*B29C 39/18* (2006.01)
*B29C 45/14* (2006.01)

(52) U.S. Cl.
CPC ..... *B29C 45/14434* (2013.01); *B29C 45/14311* (2013.01); *B29C 45/14836* (2013.01)
USPC .......................... 425/588; 425/542; 264/271.1

(58) Field of Classification Search
USPC ................ 264/271.1; 425/588, 542
See application file for complete search history.

(56) References Cited

U.S. PATENT DOCUMENTS

| | | | | |
|---|---|---|---|---|
| 4,688,752 A | * | 8/1987 | Barteck et al. | 249/85 |
| 5,069,852 A | * | 12/1991 | Leone et al. | 264/239 |
| 2008/0102237 A1 | | 5/2008 | Ortegat et al. | |

FOREIGN PATENT DOCUMENTS

| | | |
|---|---|---|
| CN | 1250147 A | 4/2000 |
| CN | 101065230 A | 10/2007 |
| EP | 0 368 817 A2 | 5/1990 |
| EP | 0 368 817 A3 | 5/1990 |
| EP | 1 897 713 A1 | 3/2008 |

(Continued)

OTHER PUBLICATIONS

International Search Report including English translation dated Aug. 4, 2009 and PCT/ISA/237 Form (Eight (8) pages).

(Continued)

*Primary Examiner* — Galen Hauth
(74) *Attorney, Agent, or Firm* — Crowell & Moring LLP

(57) ABSTRACT

Disclosed herein is an injection molding die used for producing a frame-mounted plate glass by injection molding. The die is characterized in that an auxiliary cavity is provided at a position to exposed a surface of a plate glass and communicated with a cavity for a frame through a communication opening, the cavity for the frame being provided at position facing a vehicle inside surface of the plate glass. When the die is practically used for injection molding, a load applied to a peripheral portion of the plate glass during the injection molding is reduced, so that when the frame is molded onto the plate glass by injection molding, undesired breakage of the plate glass is suppressed.

6 Claims, 3 Drawing Sheets

(56) References Cited

FOREIGN PATENT DOCUMENTS

| | | |
|---|---|---|
| GB | 2 178 362 A | 2/1987 |
| JP | 59-199228 A | 11/1984 |
| JP | 63-112127 A | 5/1988 |
| JP | 1-244918 A | 9/1989 |
| JP | 3-90922 U | 9/1991 |
| JP | 5-57797 A | 3/1993 |
| JP | 5-104642 A | 4/1993 |
| JP | 7-144338 A | 6/1995 |
| JP | 8-112831 A | 5/1996 |
| JP | 2003-48233 A | 2/2003 |
| JP | 2007-313669 A | 12/2007 |
| JP | 2008-514449 A | 5/2008 |

OTHER PUBLICATIONS

Supplementary European Search Report dated Oct. 16, 2013 (Six (6) pages).
Japanese Office Action dated May 31, 2012 (three (3) pages).
Chinese-language Combined Office Action and Search Report dated Oct. 10, 2012 (Six (6) pages).

* cited by examiner

METAL MOLD FOR INJECTION MOLDING OF FRAMED GLASS AND MANUFACTURING METHOD FOR FRAMED GLASS

TECHNICAL FIELD

The present invention relates to an injection molding die and a method that are used for producing a frame-mounted plate glass that has a frame integrally molded to a plate glass.

BACKGROUND ART

In windows of motor vehicles, such as electric train, automobile and the like, it is general to mount a plate glass to a metal vehicle body by using a plastic frame.

In recent years, such plastic frame is directly molded on a plate glass by subjecting a fluid resin to an extrusion molding or injection molding, and the frame-mounted plate glass consisting of the plate grass and the frame integrally mounted thereto is used as a part of assembling the vehicle body.

As is seen from FIG. 5, in case of producing a frame-mounted plate glass by injection molding, a plate glass 5 is held between an upper die 2 and a lower die 3 in a manner to form a cavity 4 therearound for the frame. Into the cavity 4, there is injected a fluid resin (or melted resin) for the frame. After the fluid resin in the cavity 4 solidifies, the upper die 2 is removed and a frame-mounted plate glass thus produced is removed from the lower die 3 for the production of the frame-mounted plate glass.

Since, during the injection molding, the plate glass is kept pressed by the die and a high temperature and high pressure fluid melted resin is injected into a surrounding portion of the plate glass, the plate glass is applied with a complicated stress, which tends to induce breakage of the plate glass.

One of the methods for detecting such breakage of the plate glass during injection molding is shown in Patent Document 1.

In case of integrally molding the frame onto plate glass by injection molding, usage of a dummy plate is proposed by Patent Document 2 as a technique for suppressing breakage of the plate glass.

The breakage of the plate glass occurs mainly near a gate of the die, and thus Patent Document 3 proposes provision of a plurality of gates in the injection molding die.

PRIOR ART DOCUMENTS

Patent Documents

Patent Document 1: Japanese Laid-open Patent Application (Tokkai) 2003-48233
Patent Document 2: Japanese Laid-open Patent Application (Tokkaihei) 5-57797
Patent Document 3: Japanese Laid-open Patent Application (Tokkai) 2007-313669

SUMMARY OF THE INVENTION

Among methods for avoiding breakage of the plate glass during the injection molding, the method by using the dummy plate shows a very poor productivity and the method by providing plural gates tends to induce a difficulty in practicing the same if the plate glass and/or the frame has a unique shape.

In accordance with the present invention, there is provided an injection molding die which is able to reduce a load applied to a periphery of the plate glass under injection molding thereby to avoid undesired breakage of the plate glass at the time when the frame is integrally molded to the plate glass by injection molding.

The injection molding die of the present invention is an injection molding die used for molding a plastic frame onto a peripheral portion of a plate glass by injection molding and the injection molding die is characterized in that an auxiliary cavity is provided in the die, which is exposed to a surface of the plate glass and communicated through a communication opening with a cavity for a frame, the cavity for the frame being provided at a position facing a vehicle inside surface of the plate glass.

The injection molding die of the present invention is further characterized in that a ratio $(w1+w2+w3)/w4$ is 0.5 to 1.5 wherein $w1$ is a width of the cavity for the frame which is provided at a position facing the vehicle inside surface of the plate glass, $w2$ is a width of the communication opening, $w3$ is a width of the auxiliary cavity and $w4$ is a width of cavity for a frame which is provided at a position facing a vehicle outside surface of the plate glass.

The injection molding die of the present invention is further characterized in that a thickness $t$ of the auxiliary cavity is 1.0 to 5.0 mm.

The injection molding die of the present invention is further characterized in that the auxiliary cavity is provided with a gate through which the melted resin is injected into the cavity for the frame from a runner.

A method for producing a frame-mounted plate glass according to the present invention comprises carrying out a primer treatment against a glass surface to which the frame is to be mounted; placing the plate glass in the die in such a manner that a surface of the plate glass which has not been treated with the primer faces the auxiliary cavity; and carrying out the injection molding by using the injection molding die.

DETAILED DESCRIPTION OF THE INVENTION

According to the present invention, there are provided an injection molding die used for producing a frame-mounted plate glass and a method for producing such a frame-mounted plate glass, the die and method avoiding breakage of the plate glass during injection molding of the frame.

The present invention will be described with reference to the drawings, particularly an injection molding die that is dividable into an upper die and a lower die. It is however to be noted that the present invention is not limited to such a dividable die that is dividable into the upper and lower dies. That is, the present invention is applicable to an injection molding die that is dividable into left and right dies.

In case of integrally molding a plastic frame onto a peripheral portion of a plate glass by using an injection molding die, such a problem tends to occur that the plate glass is broken during the injection molding.

Figure 1:
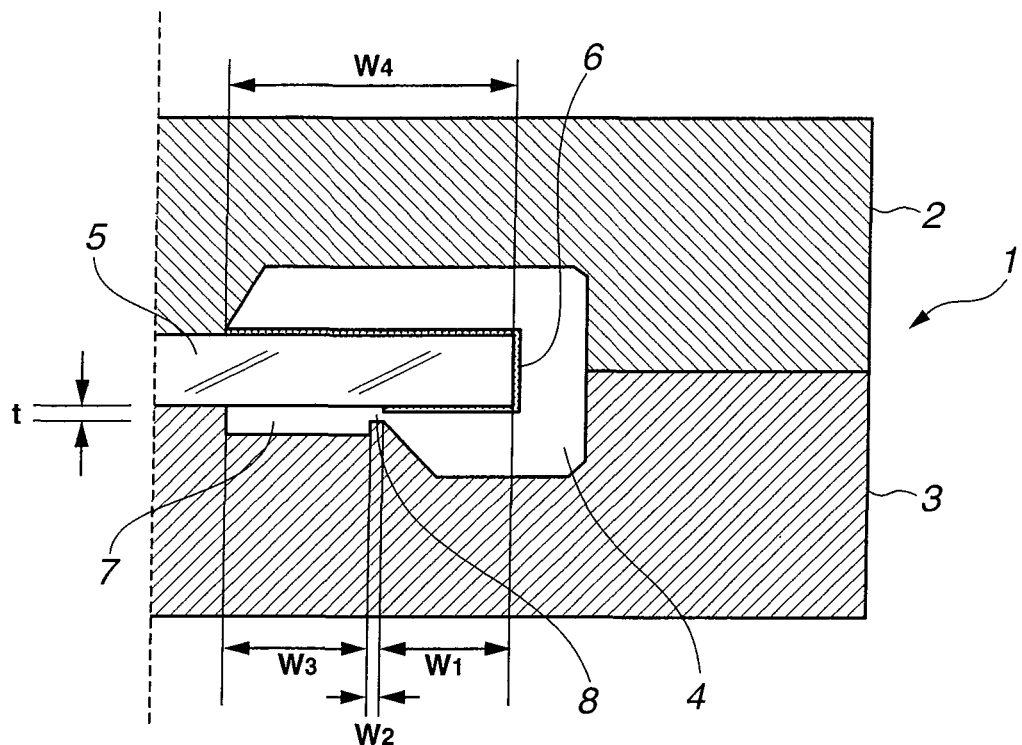
FIG. 1 is a schematically illustrated sectional view showing an embodiment of the present invention.

FIG. 1 is a schematically illustrated sectional view showing a condition wherein a plate glass 5 is put on an injection molding die 1 of the present invention, the view being taken along a surface that is perpendicular to an end surface of the plate glass 5.

The plate glass 5 is held between an upper die 2 and a lower die 3 in such a manner as to form a cavity 4 around a peripheral edge portion of the plate glass 5. Into the cavity 4 for the frame, there is injected a fluid melted resin from an inlet opening (not shown), and thus, around the peripheral edge of the plate glass 5, there is integrally molded or formed a frame.

As the plate glass 5, a flat plate glass, a curved plate glass, a reinforced plate glass, a curved and reinforced plate glass, a flattened plate glass or a laminated plate glass using a curved plate glass is usable.

It is preferable that the vehicle inside surface of the plate glass is colored in order that fixing parts such as clips, fasteners, adhesive and the like for fixing the plate glass to a vehicle body are invisible from the outside of the vehicle.

As a resin for molding the frame, thermoplastic elastomer, such as styrene system, olefin system, polyvinyl chloride system, urethane system of the like is usable.

Figure 3:
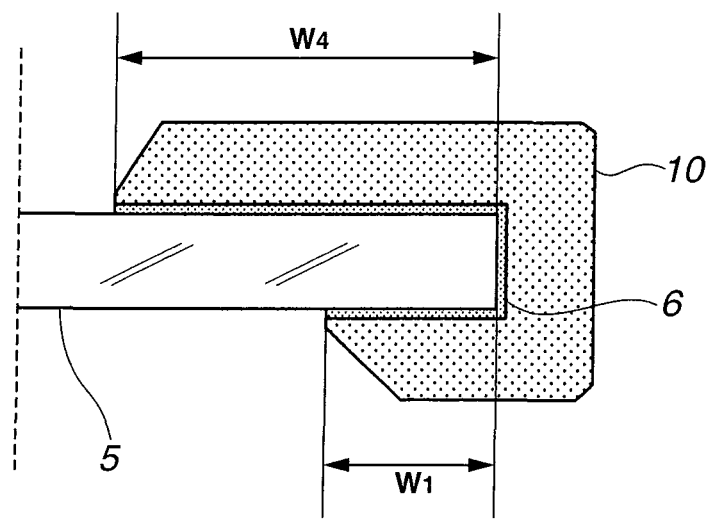
FIG. 3 is a sectional view of a frame-mounted plate glass.

As is seen from FIG. 1, in case of molding the frame onto the plate glass 5 held by the injection molding die 1, a melted resin is led from an inlet opening (not shown) of the injection molding die 1 and injected into the cavity 4 for the frame through a runner (not shown) and a gate, and as is seen from FIG. 3, a solidified frame 10 is molded or mounted on the peripheral portion of the plate glass 5 that includes an end surface and an outer surface.

When the width w4 of the frame formed on the vehicle outside surface of the plate glass 5 and the width w1 of the frame formed on the vehicle inside surface of the plate glass 5 are different, a remarkable load tends to be produced at an end portion of the plate glass 5 by the pressure possessed by the melted resin that flows in the cavity 4 for the frame. Accordingly, as is seen from FIG. 1, it is preferable to provide an auxiliary cavity 7 at a position that faces the vehicle inside surface of the plate glass.

In order to prevent breakage of the plate glass during the injection molding, the ratio of (w1+w2+w3) to w4 should be 0.5 to 1.5 wherein w1 is a width of the cavity for the frame which is provided at a position facing the vehicle inside surface of the plate glass, w2 is a width of the communication opening, w3 is a width of the auxiliary cavity and w4 is a width of cavity for a frame which is provided at a position facing a vehicle outside surface of the plate glass. More preferably, the ratio should be 0.8 to 1.2.

Preferably, the thickness of the auxiliary cavity 7 should be 1.0 to 5.0 mm. More preferably, the thickness should be 1.5 to 4.0 mm. If the thickness of the auxiliary cavity 7 is smaller than 1 mm, it tends to occur that the melted resin fails to be sufficiently led to the auxiliary cavity, which may cause the breakage of the plate glass. Furthermore, since the resin body that is solidified in the auxiliary cavity becomes waste, the thickness of the auxiliary cavity should be as small as possible, for example the thickness should be smaller than 5.0 mm.

The auxiliary cavity 7 is communicated with the cavity 4 for the frame through the communication opening 8. As is seen from FIG. 2, upon completion of injection molding, a molded frame 10 and a molded resin unit 11 including a solidified resin in the auxiliary cavity and a solidified resin in the communication opening are formed around the edge of the plate glass 5.

Onto the outer surface of the plate glass 5 on which the frame 10 is to be formed, there has been applied a primer 6. With such primer, the frame 10 and the plate glass 5 are tightly bonded. However, the molded resin unit 11, 12 solidified in the auxiliary cavity 7 and the communication opening 8 can be easily released from the outer surface of the plate glass since the primer 6 has not been applied to such outer surface, and the molded resin unit is cut and removed from the frame 10.

Figure 4:
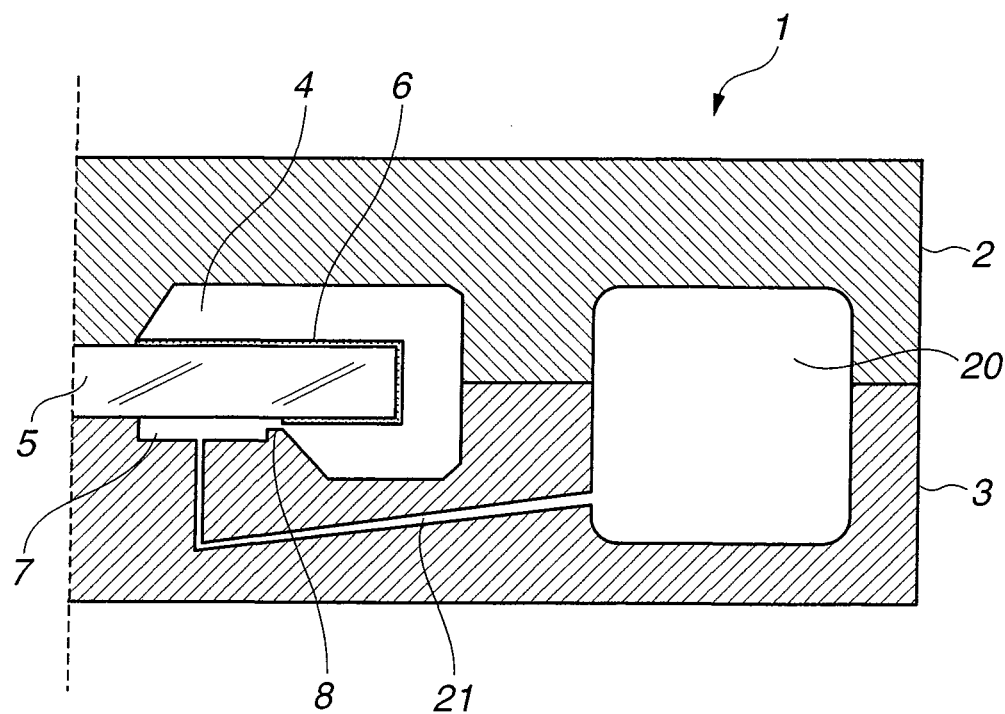
FIG. 4 is a schematically illustrated sectional view showing another embodiment of the present invention.
Figure 5:
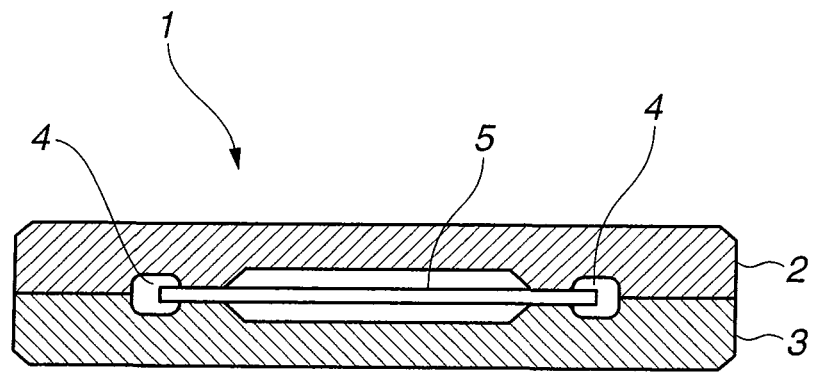
FIG. 5 is a schematically illustrated sectional view depicting a method for producing a frame-mounted plate glass by injection molding.

FIG. 4 shows another embodiment of the present invention. In the embodiment, a gate 21 for injecting a melted resin to the cavity 4 for the frame from a runner 20 is communicated with an auxiliary cavity, so that the melted resin from the auxiliary cavity is led into the cavity 4 for the frame.

In case of providing the cavity 4 for the frame with the gate, it becomes necessary to remove or cut out a resin part solidified in the gate from the molded frame after completion of the injection molding. However, by providing the gate 21 to the auxiliary cavity 7, adjusting the trace of the gate is unnecessary.

EMBODIMENT

In the following, an embodiment of the present invention will be described. It is however to be noted that the invention is not limited to the following embodiment.

A rectangular plate glass of a size of 400 mm×600 mm with a thickness of 3 mm was used, and a frame was integrally molded on a peripheral portion of the plate glass by injection molding.

As is seen from FIG. 1, one side of the molded frame which constitutes a vehicle outside frame portion had a width "w4" of about 30 mm and a thickness of about 3.0 mm, and the other side of the molded frame which constitutes a vehicle inside frame portion had a width "w1" of about 8 mm and a thickness of about 2.0 mm, so that the width "w4" of the vehicle outside frame portion was about four times as large as the width "w1" of the vehicle inside frame portion resulting in that the width "w4" of the vehicle outside frame portion was greatly larger than the width "w1" of the vehicle inside frame portion.

Therefore, in the injection molding die of the embodiment, in addition to the cavity 4 for the frame in which the above-mentioned frame is molded, there was further provided the auxiliary cavity 7 that is communicated with the cavity 4 for the frame through the communication opening 8.

The width w3 of the auxiliary cavity was about 8 mm, the thickness was about 2.0 mm. The width w2 of the communication opening was about 4 mm and the thickness was about 1.0 mm. The value of (w1+w2+w3)/w4 was about 0.7.

Before placing the plate glass 5 onto the lower die 3 after opening the upper die 2 of the injection molding die, a primer was applied to an outer surface of a peripheral portion of the plate glass 5 on which surface the frame was to be formed.

As the primer, a nylon system adhesive (main ingredient: denatured nylon, solvent: denatured ethanol) was used.

The plate glass 34 was placed between the upper and lower dies 2 and 3 and by using an injection device, a melted resin (polyvinyl chloride resin that contains both a plasticizer and a filler mixed thereto, produced by Shin-Etsu Polymer Co., Ltd) was injected into the cavity 4 for the frame from an injection opening (not shown) of the injection molding die.

The injection of the resin was carried out under a condition wherein the temperature of the melted resin was 190° C.±10°

C., the temperature of the die was 50° C.±10° C. and the injection pressure was 2 to 6 MPa.

Figure 2:
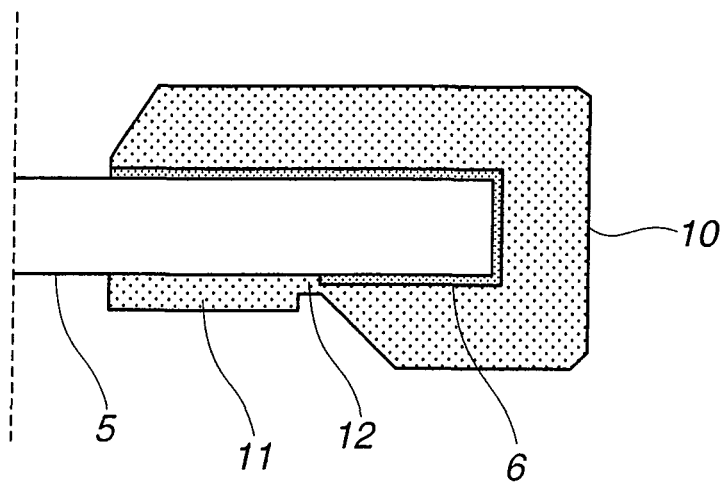
FIG. 2 is a sectional view of a frame that is produced by injection molding.

After solidification of the injected resin, a unit 11, 12 as shown in FIG. 2 including the plate glass 5 to which a molded frame 10 with resin portions solidified in the communication opening and the auxiliary cavity are integrally mounted was removed from the injection molding die 1, and the unit was cut at a boundary part between the resin portion 12 solidified in the communication opening and the molded frame 10, so that such a frame-mounted plate glass as shown in FIG. 3 was produced which comprises the plate glass 5 to which the frame 10 is integrally molded.

In the embodiment of the present invention, undesired breakage of the plate glass did not occur.

COMPARATIVE EXAMPLE

Figure 6:
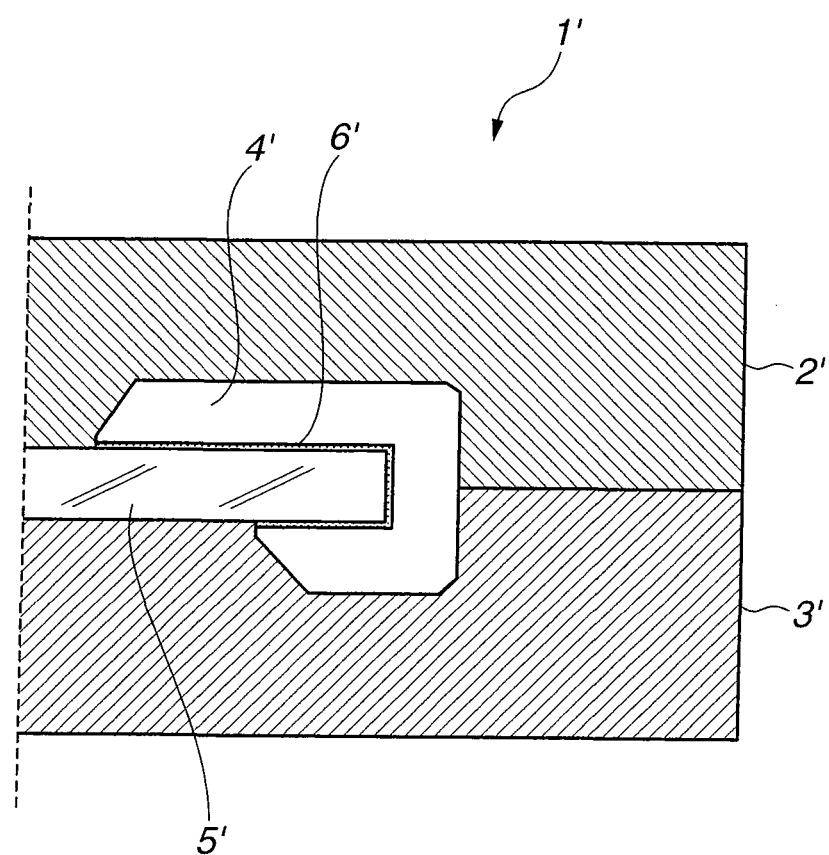
FIG. 6 is a schematically illustrated sectional view of a cavity that produces a conventional frame.

By using an injection molding die as shown in FIG. 6 that has no communication opening 8 nor auxiliary cavity 7, similar injection molding operation was carried out. However, in this case, breakage of the plate glass occurred frequently, and thus the comparative example was quite poor in productivity as compared with the embodiment.

DESCRIPTION OF REFERENCES 1, 1' . . . injection molding die
2, 2' . . . upper die
3, 3' . . . lower die
4, 4' . . . cavity for frame
5, 5' . . . plate glass
6, 6' . . . primer
7 . . . auxiliary cavity
8 . . . communication opening
10 . . . frame
11 . . . resin portion solidified in auxiliary cavity
12 . . . resin portion solidified in communication opening
20 . . . runner
21 . . . gate

The invention claimed is:

1. An injection molding die used for producing, by injection molding, a frame-mounted plate glass that comprises a plate glass and a plastic frame integrally molded to a peripheral portion of the plate glass, the injection molding die comprising:
a lower die that is set to face a vehicle inside surface of the plate glass;
an upper die that is set on the lower die in a manner to face a vehicle outside surface of the plate glass; and
a series of a cavity, an auxiliary cavity and a narrowed communication opening of the lower die arranged to face the peripheral portion of the plate glass when the plate glass is set between the lower and upper dies,
wherein the narrowed communication opening is arranged between the cavity and the auxiliary cavity to communicate between the cavity and the auxiliary cavity,
wherein the cavity, the auxiliary cavity and the narrowed communication opening overlap the peripheral portion of the glass plate in a direction perpendicular to the vehicle inside surface of the plate glass,
wherein the auxiliary cavity and the narrowed communication opening are arranged to expose only to the vehicle inside surface of the plate glass,
wherein an end of the narrowed communication opening adjacent to the cavity is located away from an outer edge of the plate glass a distance greater than twice a thickness of the narrowed communication opening in a direction perpendicular to the vehicle inside surface of the plate glass, and
a ratio (w1+w2+w3)/w4 is 0.8 to 1.2 wherein w1 is a width of the cavity for the frame which is provided at a position facing the vehicle inside surface of the plate glass, w2 is a width of the communication opening, w3 is a width of the auxiliary cavity and w4 is a width of cavity for a frame which is provided at a position facing a vehicle outside surface of the plate glass.

2. An injection molding die as claimed in claim 1, which is further characterized in that a thickness of the auxiliary cavity is 1.0 to 5.0 mm.

3. An injection molding die as claimed in claim 1, which is further characterized in that the auxiliary cavity is provided with a gate through which the melted resin is injected into the cavity for the frame from a runner.

4. A method for producing a frame-mounted plate, the method glass, the method comprising:
applying a primer treatment to a glass surface to which the frame is to be mounted;
placing the plate glass in an injection molding die in such a manner that a surface of the plate glass which has not been treated with the primer faces the auxiliary cavity; and
carrying out the injection molding by using the injection molding die, wherein the injection molding die comprises:
a lower die that is set to face a vehicle inside surface of the plate glass;
an upper die that is set on the lower die in a manner to face a vehicle outside surface of the plate glass; and
a series of a cavity, an auxiliary cavity and a narrowed communication opening of the lower die arranged to face the peripheral portion of the plate glass when the plate glass is set between the lower and upper dies, wherein
the narrowed communication opening is arranged between the cavity and the auxiliary cavity to communicate between the cavity and the auxiliary cavity,
the cavity, the auxiliary cavity and the narrowed communication opening overlap the peripheral portion of the glass plate in a direction perpendicular to the vehicle inside surface of the plate glass,
the auxiliary cavity and the narrowed communication opening are arranged to expose only to the vehicle inside surface of the plate glass,
an end of the narrowed communication opening adjacent to the cavity is located away from an outer edge of the plate glass a distance greater than twice a thickness of the narrowed communication opening in a direction perpendicular to the vehicle inside surface of the plate glass, and
a ratio (w1+w2+w3)/w4 is 0.8 to 1.2 wherein w1 is a width of the cavity for the frame which is provided at a position facing the vehicle inside surface of the plate glass, w2 is a width of the communication opening, w3 is a width of the auxiliary cavity and w4 is a width of cavity for a frame which is provided at a position facing a vehicle outside surface of the plate glass.

5. The method as claimed in claim 4, wherein a thickness of the auxiliary cavity is 1.0 to 5.0 mm.

6. The method as claimed in claim 4, wherein the auxiliary cavity is provided with a gate through which the melted resin is injected into the cavity for the frame from a runner.

* * * * *